(12) United States Patent
Hicks et al.

(10) Patent No.: US 10,831,475 B2
(45) Date of Patent: Nov. 10, 2020

(54) PORTABILITY ANALYZER

(71) Applicant: International Business Machines Corporation, Armonk, NY (US)

(72) Inventors: Andrew Hicks, Wappingers Falls, NY (US); Miles C. Pedrone, Wappingers Falls, NY (US); Tynan J. Garrett, Poughkeepsie, NY (US); Michael Peter Lyons, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/378,881

(22) Filed: Apr. 9, 2019

(65) Prior Publication Data
US 2020/0326935 A1 Oct. 15, 2020

(51) Int. Cl.
*G06F 8/76* (2018.01)
*G06N 20/00* (2019.01)
*G06F 8/71* (2018.01)

(52) U.S. Cl.
CPC .............. *G06F 8/76* (2013.01); *G06F 8/71* (2013.01); *G06N 20/00* (2019.01)

(58) Field of Classification Search
CPC .............. G06N 20/00; G06F 8/76; G06F 8/71
USPC .......................................................... 717/121
See application file for complete search history.

(56) References Cited

U.S. PATENT DOCUMENTS

| 5,293,629 | A | 3/1994 | Conley et al. |
| 8,122,440 | B1 * | 2/2012 | Lentini .................. G06F 8/433 717/140 |
| 9,608,931 | B2 | 3/2017 | Sharma et al. |
| 9,996,326 | B2 | 6/2018 | Gschwind et al. |
| 2003/0004754 | A1 | 1/2003 | Krutz |
| 2007/0234285 | A1 * | 10/2007 | Mendoza ................. G06F 8/51 717/114 |
| 2013/0311968 | A1 * | 11/2013 | Sharma ............... G06F 11/3692 717/101 |
| 2017/0091657 | A1 * | 3/2017 | Kida ..................... G06N 20/00 |

(Continued)

OTHER PUBLICATIONS

Radoi et al, "Translating Imperative Code to MapReduce", [Online], 2014, pp. 909-927, [Retrieved from internet on Jul. 1, 2020], <https://dl.acm.org/doi/pdf/10.1145/2660193.2660228> (Year: 2014).*

(Continued)

*Primary Examiner* — Geoffrey R St Leger
*Assistant Examiner* — Zengpu Wei
(74) *Attorney, Agent, or Firm* — Cantor Colburn LLP; Teddi Maranzano

(57) ABSTRACT

Assessing portability of source code based on predictions from a learning model trained with historical outputs from a portability analyzer. A request is received as input to assess portability of source code from a source environment to at least one target environment. The learning model is applied to the source code to predict a level of portability of the source code to the at least one target environment. Results from a portability analyzer that are based on the level of portability predicted by the learning model include a confidence measure associated with one or more portions of the source code indicating the ease of portability of the one or more portions of the source code to each of the at least one target environments.

17 Claims, 4 Drawing Sheets

(56) References Cited

U.S. PATENT DOCUMENTS

2018/0165278 A1\* 6/2018 He ............... G06F 40/44
2020/0034211 A1\* 1/2020 Kumar P ............... G06N 20/00

OTHER PUBLICATIONS

Balogh et al, "OP2-Clang: A Source-to-Source Translator Using Clang/LLVM LibTooling", [Online], 2018, pp. 59-70, [Retrieved from internet on Jul. 1, 2020], <https://ieeexplore.ieee.org/stamp/stamp,jsp?tp=&arnumber=8639205> (Year: 2018).\*

Nguyen et al, "Lexical Statistical Machine Translation for Language Migration", [Online], 2013, pp. 651-654, [Retrieved from internet on Jul. 1, 2020], <https://dl.acm.org/doi/pdf/10.1145/2491411.2494584> (Year: 2013).\*

Douce et al.; "Automatic Test-Based Assessment of Programming: A Review"; ACM Journal of Educational Resources in Computing; vol. 5, No. 3, Article 4; Sep. 2005; 13 Pages.

Fornaia et al.; "Is My Code Easy to Port? Using Taint Analysis to Evaluate and Assist Code Portability"; IEEE 26th International Conference on Enabling Technologies: Infrastructure for Collaborative Enterprises; 2017; pp. 269-274.

Washizaki et al.; "A Framework for Measuring and Evaluating Program Source Code Quality"; J. Munch and P. Abrahamsson (Eds.): PROFES 2007; LNCS 4589; 2007; pp. 284-299.

\* cited by examiner

PORTABILITY ANALYZER

BACKGROUND

The invention relates generally to porting source code and, more particularly, to analyzing the viability of porting source code.

There is often a need to transfer or port software from an existing language or platform to somewhere else. It is rarely a simple procedure as fundamental changes in a programming language or a platform's constructs can precipitate significant incompatibilities for even the simplest of code. The fundamental differences between languages or constructs often demand a wide range of required changes. Sometimes rewriting of existing code is required.

Whether it is worthwhile to port source code from one environment to another often involves a complex analysis. In particular, whether it is preferable to begin a porting project or instead rewrite software for another environment depends on the amount of time required and the available resources. Although individual porting tools such as linters and optimization compilers exist, these tools do not evaluate the overall viability of porting from a source environment to one or more other target environments. Moreover, these known porting tools do not learn over time. Thus, rather than merely performing an analysis of the function of a particular porting tool, what is needed is the ability to obtain an overall understanding as to how portable a particular project is.

SUMMARY

According to a non-limiting embodiment, a computer-implemented method for assessing portability of source code is provided. The method includes receiving as input a request to assess portability of the source code from a source environment to at least one target environment. The method also includes applying a learning model to the source code to predict a level of portability of the source code to the at least one target environment. The method then includes providing results from a portability analyzer based on the level of portability predicted by the learning model, wherein the results comprise confidence measures associated with one or more portions of the source code for indicating ease of portability of the one or more portions of the source code to each of the one or more target environments.

According to another non-limiting embodiment, a system for assessing portability of source code is provided. The system includes a learning model to predict a level of portability of the source code to at least one target environment. The system also includes a portability analyzer receiving as input a request to assess portability of the source code from a source environment to at least one target environment and for applying the learning model to the source code. The portability analyzer provides results comprising a confidence measure associated with each of one or more portions of the source code for indicating ease of portability of the one or more portions of the source code to each of the at least one target environment.

According to yet another non-limiting embodiment, a computer program product is provided. The computer program product includes a computer readable storage medium having program instructions embodied therewith, the program instructions executable by a computer processor to cause the computer processor to perform a method for assessing portability of source code. A non-limiting example of the method includes receiving as input a request to assess portability of the source code from a source environment to at least one target environment. The method also includes applying a learning model to the source code to predict a level of portability of the source code to the at least one target environment. The method then includes providing results from a portability analyzer based on the level of portability predicted by the learning model, wherein the results comprise confidence measures associated with one or more portions of the source code for indicating ease of portability of the one or more portions of the source code to each of the at least one target environment.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
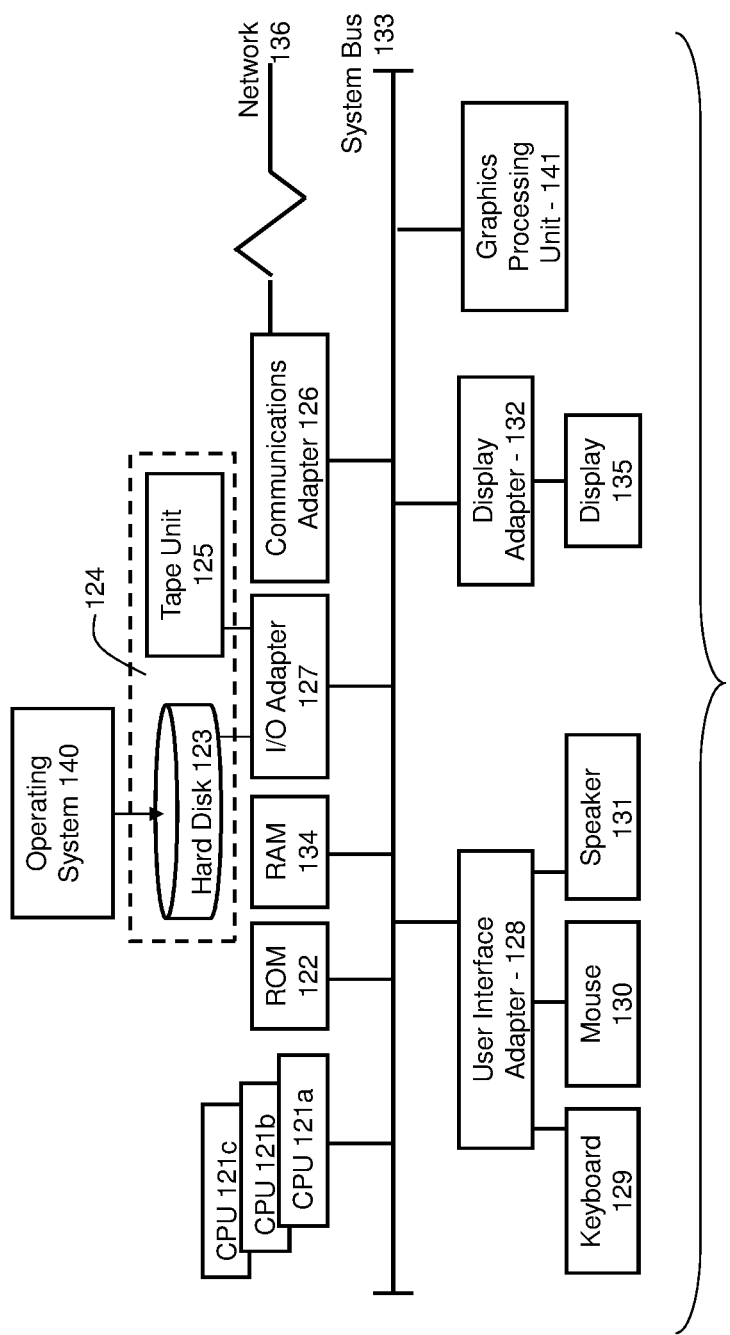
FIG. 1 is a block diagram illustrating a computer system for assessing portability of source code in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring now to FIG. 1, a computer system 100 is illustrated according to a non-limiting embodiment. In FIG. 1 the computer system 100 is shown in the form of a general-purpose computer device which also may be referred to as a processing device. The components of computer system 100 may include, but are not limited to, one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124.

Operating system 140 for execution on the processing system 100 may be stored in mass storage 124. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 124, input means such as keyboard 129 and mouse 130, and output capability including speaker 131 and display 135. In one embodiment, a portion of RAM 134 and mass storage 124 collectively store the operating system to coordinate the functions of the various components shown in FIG. 1.

Figure 2:
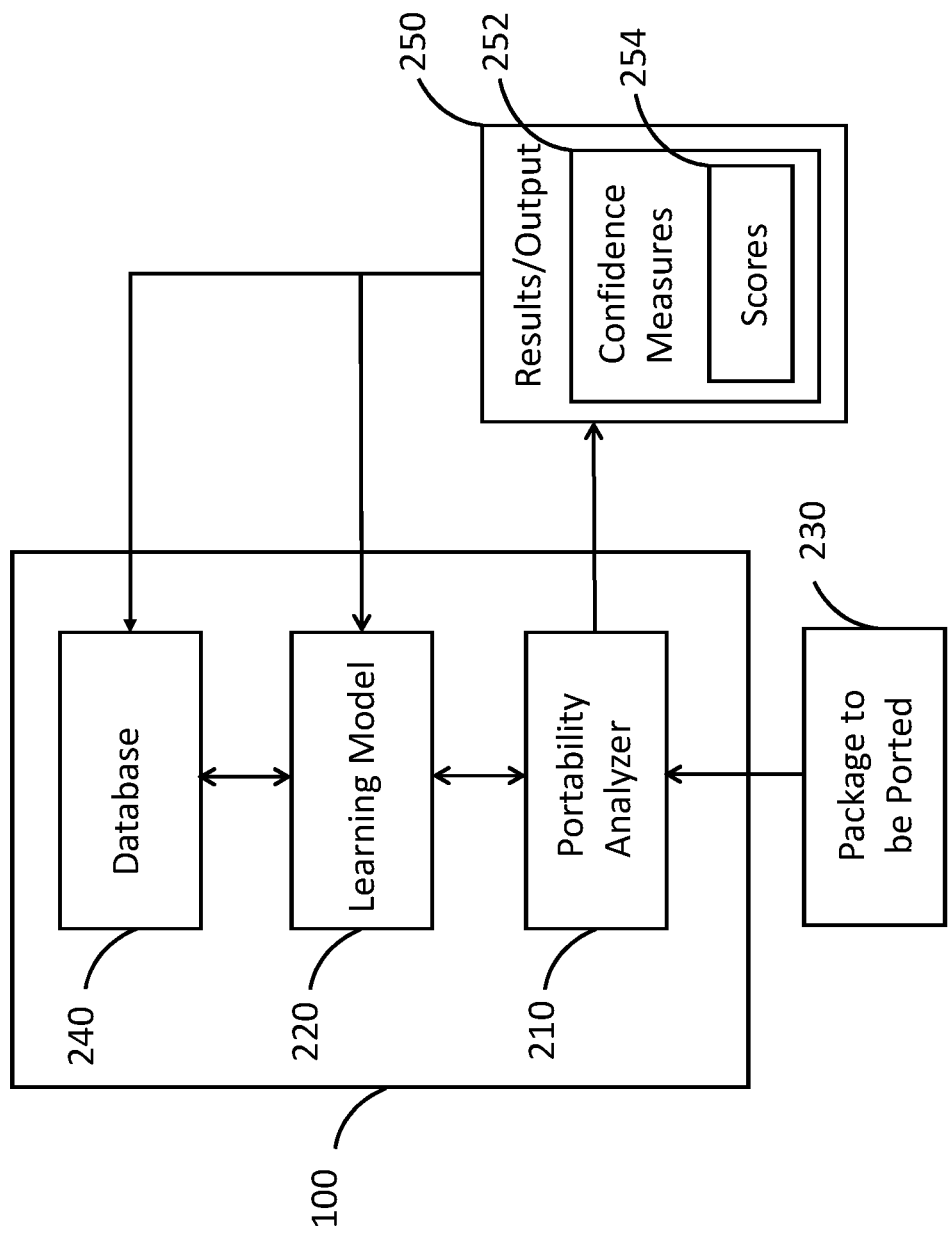
FIG. 2 is a block diagram illustrating accessing a learning model in order to assess the portability of a software package and the generation of output related to the viability of porting the software package according to one or more embodiments of the present invention.

FIG. 2 depicts a portability analyzer 210 coupled to a predictive learning model 220. The portability analyzer 210 receives requests via the computer system 100 to assess the portability of a package 230 of source code or a set of computer programs such as application software. The ease of portability may be assessed from a source environment to one or more other target environments. These environments may be any type of language or platform where porting of software is desirable. Thus, the scope of this disclosure includes many different application types and libraries such as, for example, machine/deep learning frameworks, mathematical libraries, logging, message queues, and containers. For example, it may be desirable to migrate source code from Python 2.X to Python 3.X or, alternatively, it may be desirable to migrate gaming application software from one operating system to another operating system. However, with other hardware architectures there are differences in how instruction set operations are performed and certain code segments can use a more inefficient instruction. Other instances include operations that rely on certain endianness (byte ordering) of the system and how vector processing units are handled.

The portability analyzer 210 is one or more software modules on the computer system 100 that provides results 250 such as a detailed analyses including, for example, a report or an insights log on how flexibly or easily code is ported across different implementations. For example, the portability analyzer 210 performs static analysis via porting analytic tools such as, for example, crawlers, keyword associations, and outlier functions. The portability analyzer's results 250 include assignments of relative effort required to port one or more portions or all of the source code. The results 250 may go directly to the learning model 220 and/or be stored in a database 240 of the computer system 100 or in a remote database in order to train the learning model 220. The database 240 stores historical outputs from the portability analyzer 210.

The learning model 220 may be any known model that utilizes machine learning, pattern recognition or statistical techniques to give computers the ability to train and learn with data. The learning model 220 is trained using pre-existing or known data/inputs and outcomes/results from the portability analyzer 210. Using analytic capabilities and techniques, the learning model establishes relationships between inputs and results. Once deemed accurate based on the historical data and corresponding outcomes, the learning model 220 is then applied, via the portability analyzer 210, to new inputs such as the package 230 to determine automated outcomes/results.

The portability analyzer 210 utilizes predictive information from the learning model 220 based on previous portings, as well as other user-provided inputs regarding the package 230, the source environment and the one or more target environments, to estimate or assess the portability of the package 230. For example, learning model 220 can determine if all or part of a package 230 looks similar to a previously ported package and then, based on the prediction from the learning model 220, the portability analyzer 210 can indicate the extent to which all or part of the package 230 may be easily ported. The results 250 output from the portability analyzer 210 can include information such as the reasons as to why the package 230 may be easy or difficult to port based on the dependencies seen in the past. The results 250 output from the portability analyzer 210 then become feedback and are stored as historical prediction data for the learning model 220.

The results 250 output from the portability analyzer 210 can also include one or more confidence measures 252 for the package 230. Each confidence measure 252 may be based on different characteristics associated with similar code that has been analyzed before in past porting projects and whether there were any past porting difficulties such as architectural constraints when porting the similar code between different programming languages or between different platforms. For example, one portion of source code could have one confidence measure 252 based on that portion's relative ease for porting to a particular target environment and another confidence measure 252 based on that same portion's relative ease for porting to a different target environment. In other words, each portion of the source code could have multiple confidence measures 252 corresponding with multiple target environments. In another example, a portion of the source code is associated with a confidence measure 252 corresponding with a high level of portability to a target environment and another portion of the source code is associated with a confidence measure 252 indicating a low level of portability to that same target environment. Also, each porting project such as the package 230 can have different overall confidence measures 252 for each of one or more target environments.

The results 250 may include other information such information included as part of an insights log that identifies the one or more confidence measures 252 as well as, for example, how much time and resources required, in order to provide an indication as to the ease of portability for each portion and/or all of the source code to the one or more target environments. Also, the confidence measures 252 may take into consideration or be associated with one or more tools for porting the source code. Each confidence measure 252 may include an alphanumeric score 254 to indicate the viability of porting all or part of a porting project. Different parts of a porting project could have different scores. For example, the scores 254 could range, for example, from 0 to 1, 1 to 10 or some other range to indicate to what extent all or part of a project is worth porting. Scores 254 may be associated with each one of a combination of tools that may be used to port a particular package. In one or more embodiments, the higher the score the more confident the understanding is that porting a particular project will be successful. If part of a package has never been ported before, there is increasing exposure to the possibility of significant porting issues resulting in increased testing and validation and, therefore, the confidence measure/score 252, 254 would be low indicating uncertainty as to whether the porting project can be performed with ease.

Figure 3:
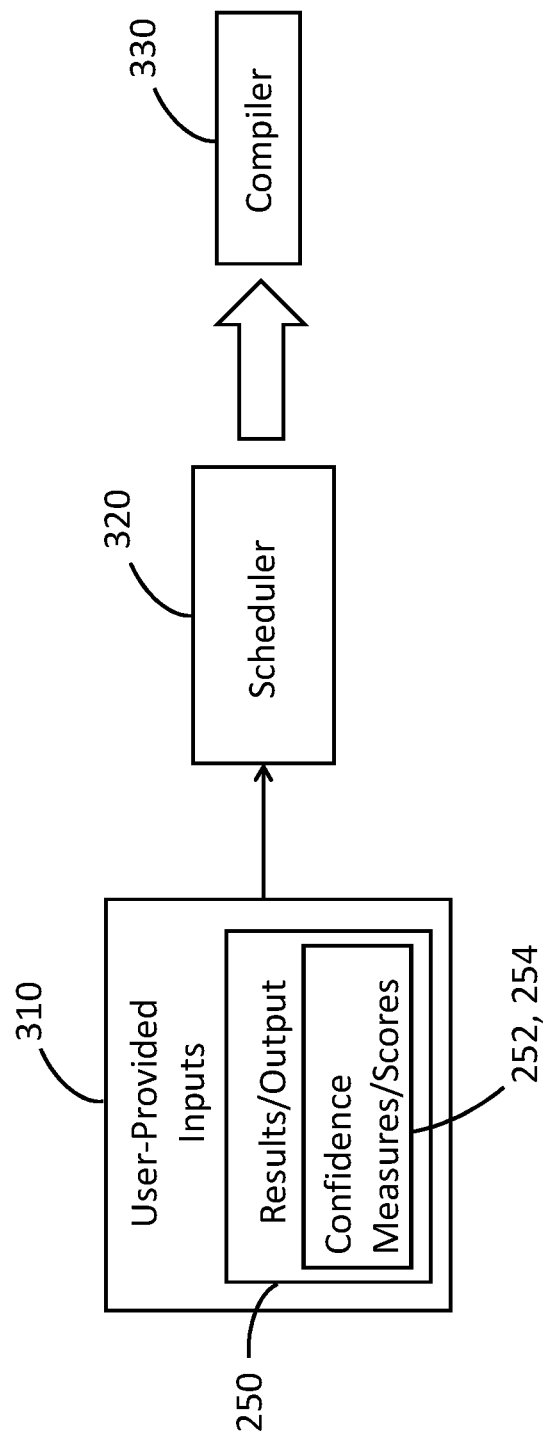
FIG. 3 is a block diagram illustrating receiving inputs and constraints for generating a schedule utilized for driving a porting compiler according to one or more embodiments of the present invention.

FIG. 3 illustrates a block diagram where the results 250 from the portability analyzer 210 are provided as part of user-provided inputs 310 to a scheduler 320 for driving a porting compiler 330. The user-provided inputs 310, along with the results 250, are used for generating a schedule utilized for driving the porting compiler 330 in order to port the package 230 to one or more target environments. Although FIG. 3 depicts the scheduler 320 and the compiler 330 as being separate, part or all of the scheduler 320 may be included with the compiler 330. Also, the scheduler 320 and the compiler 330 may be part of the computer system 100.

In an exemplary embodiment for assessing portability, a software package, such as a mathematical library between different architectures, would be ingested into the portability analyzer 210 where the code is analyzed to ascertain particular features of the software package. For example, features such as, but not limited to, the presence of keywords, outlier functions, test quantities, code coverage, historical code/compilation issue comparisons, number of external interfaces, number of external libraries used, and downloads/usage on a central repository platform such as a build automation tool, for example, Apache Maven, is determined. The portability analyzer 210 then utilizes predictive information from the learning model 220 regarding historical aspects similar to or related to the software package to be ported in order to access the ease of portability. The portability analyzer 210 then outputs results 250. The results 250 can include different confidence measures 252 based on different features or characteristics of the mathematical library and the particular target environment. For example, different confidence scores 252 may be given for an estimated time to port the mathematical library, the difficulty of the port, and scores for built in tests. Each confidence score 252 gives the user an understanding of the landscape of the mathematical library as to what can reasonably for into a release or planning schedule.

Figure 4:
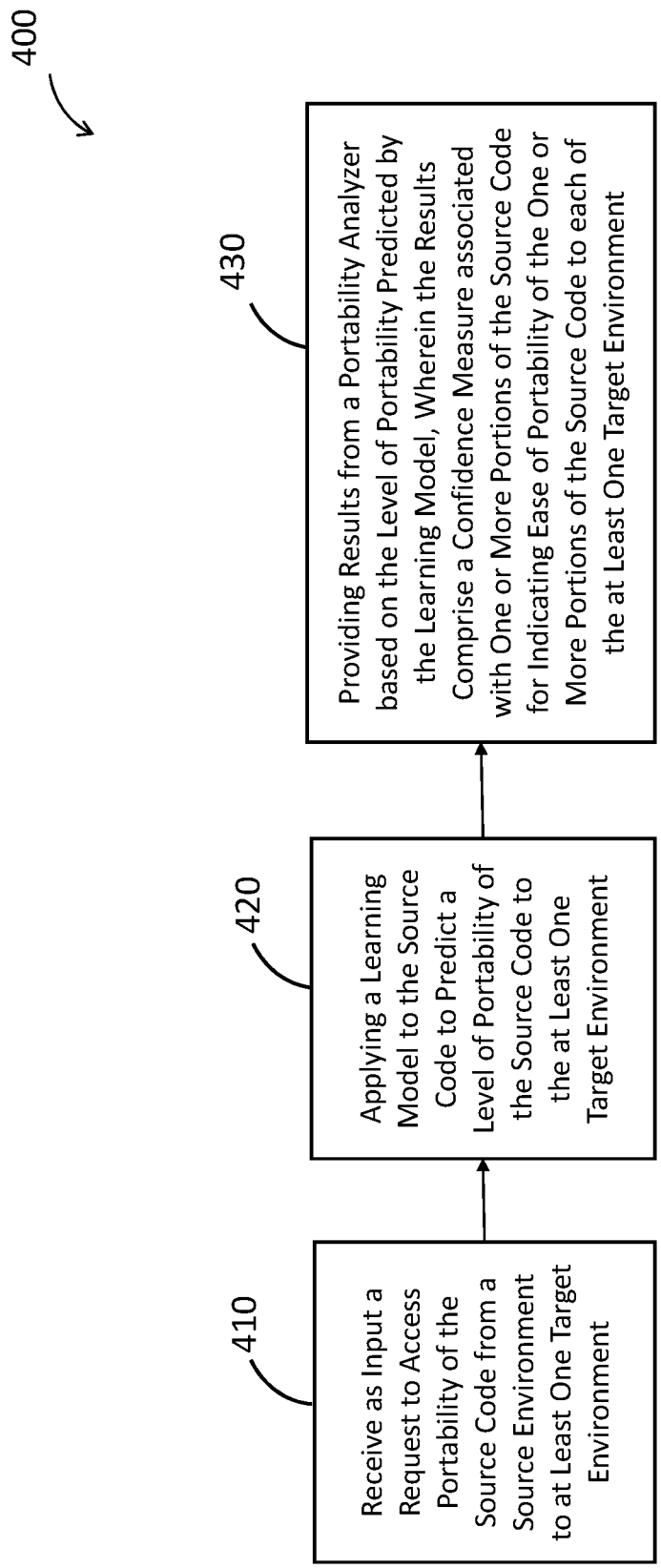
FIG. 4 is a flow diagram illustrating a method for assessing portability according to one or more embodiments of the present invention.

Turning now to FIG. 4, a computer-implemented method 400 for assessing portability of source code is illustrated according to a non-limiting embodiment. The flow diagram of FIG. 4 illustrates the method 400 that includes process block 410 for receiving as input a request to assess portability of the source code from a source environment to at least one target environment. The source code may be a set of computer programs such as application software and the at least one target environment may be a plurality of target environments. The method 400 also includes process block 420 for applying a learning model to the source code to predict a level of portability of the source code to the at least one target environment. The method 400 then includes process block 430 for providing results from a portability analyzer based on the level of portability predicted by the learning model, wherein the results comprise a confidence measure associated with one or more portions of the source code for indicating ease of portability of the one or more portions of the source code to each of the at least one target environment.

The computer-implemented method 400 may also include one or more other process blocks. In one or more embodiments, the method 400 can include training the learning model with historical outputs from the portability and inputting the received inputs and outputs from the portability analyzer into a database as historical data for the learning model. The method 400 may also include generating an insights log comprising the confidence measures indicating the ease of portability for each of a plurality of portions of the source code to the at least one target environment via each of a plurality of tools for porting the source code. The method 400 may also include utilizing the results to schedule porting of the source code via a scheduler for a porting compiler.

In one or more embodiments, the computer-implemented method 400 can also include associating corresponding confidence measures or scores with different portions of source code. The method 400 may also include scoring one or more portions or all of the source code based on the ease of porting each of the one or more portions of the source code and/or all of the source code. For example, a portion of the source code is associated with a confidence measure corresponding with a high level of portability and another portion of the source code is associated with a confidence measure indicating a low level of portability.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a computer implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for assessing portability of source code, comprising:
    receiving, by a processor, as input a request to assess portability of the source code, the source code being written in a first programming language, from the first programming language to a second programming language, wherein the first programming language is distinct from the second programming language;
    applying a machine learning model to the source code to predict a level of portability of the source code to the second programming language; and
    providing results from a portability analyzer based on the level of portability predicted by the machine learning model, wherein the results comprise a confidence measure associated with one or more portions of the source code for indicating ease of portability of the one or more portions of the source code to the second programming language.

2. The computer-implemented method of claim 1 wherein the second programming language is one of a plurality of programming languages, and wherein the results comprise a confidence measure associated with one or more portions of the source code for indicating ease of portability of the one or more portions of the source code to each of the plurality of programming languages.

3. The computer-implemented method of claim 1 wherein the source code is application software.

4. The computer-implemented method of claim 1 wherein each of a plurality of portions of the source code is associated with a corresponding confidence measure.

5. The computer-implemented method of claim 1 wherein the confidence measure is a score.

6. The computer-implemented method of claim 1 further comprising training the machine learning model with historical outputs from a portability analyzer.

7. The computer-implemented method of claim 1 further comprising generating an insights log comprising the confidence measures indicating the ease of portability for each of a plurality of portions of the source code to the second programming language via each of a plurality of tools for porting the source code.

8. The computer-implemented method of claim 1 wherein a portion of the source code is associated with a confidence measure corresponding with a high level of portability and another portion of the source code is associated with a confidence measure indicating a low level of portability.

9. The computer-implemented method of claim 1 further comprising utilizing the results to schedule porting of the source code to the second programming language.

10. A computer program product comprising a computer readable storage medium having program instructions embodied therewith, the program instructions executable by a computer processor to cause the computer processor to perform a method for assessing portability of source code, comprising:
    receiving as input a request to assess portability of the source code, the source code being written in a first programming language, from the first programming language to a second programming language, wherein the first programming language is distinct from the second programming language;
    applying a machine learning model to the source code to predict a level of portability of the source code to the second programming language; and
    providing results from a portability analyzer based on the level of portability predicted by the machine learning model, wherein the results comprise a confidence measure associated with one or more portions of the source code for indicating ease of portability of the one or more portions of the source code to the second programming language.

11. The computer program product of claim 10 wherein the second programming language is one of a plurality of programming languages, and wherein the results comprise a confidence measure associated with one or more portions of the source code for indicating ease of portability of the one or more portions of the source code to each of the plurality of programming languages.

12. The computer program product of claim 10 wherein a portion of the source code is associated with a confidence measure corresponding with a high level of portability and another portion of the source code is associated with a confidence measure indicating a low level of portability.

13. The computer program product of claim 10 wherein the method further comprises utilizing the results to schedule resources for porting the source code to the second programming language.

14. A system comprising:
a memory having computer readable instructions; and
one or more processors for executing the computer readable instructions, the computer readable instructions controlling the one or more processors to perform operations comprising:
  receiving as input a request to assess portability of the source code, the source code being written in a first programming language, from the first programming language to a second programming language, wherein the first programming language is distinct from the second programming language;
  applying a machine learning model to the source code to predict a level of portability of the source code to the second programming language; and
  providing results from a portability analyzer based on the level of portability predicted by the machine learning model, wherein the results comprise a confidence measure associated with one or more portions of the source code for indicating ease of portability of the one or more portions of the source code to the second programming language.

15. The system of claim 14 wherein the second programming language is one of a plurality of programming languages, and wherein the results comprise a confidence measure associated with one or more portions of the source code for indicating ease of portability of the one or more portions of the source code to each of the plurality of programming languages.

16. The system of claim 14 wherein a portion of the source code is associated with a confidence measure corresponding with a high level of portability and another portion of the source code is associated with a confidence measure indicating a low level of portability.

17. The system of claim 14 wherein the method further comprises utilizing the results to schedule resources for porting the source code to the second programming language.

\* \* \* \* \*